(12) United States Patent
Shen et al.

(10) Patent No.: US 8,010,602 B2
(45) Date of Patent: Aug. 30, 2011

(54) LEVERAGING COMMUNICATIONS TO IDENTIFY SOCIAL NETWORK FRIENDS

(75) Inventors: Jennifer Iting Shen, Santa Clara, CA (US); Omar H. Shahine, Menlo Park, CA (US); Steven D. Kafka, Mountain View, CA (US); Jennie Park Telehowski, Alviso, CA (US); Eliot Gillum, Mountain View, CA (US); Sara Liu Yang, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 46 days.

(21) Appl. No.: 12/200,585

(22) Filed: Aug. 28, 2008

(65) Prior Publication Data

US 2010/0057858 A1     Mar. 4, 2010

(51) Int. Cl.
*G06F 15/16* (2006.01)

(52) U.S. Cl. ........ 709/204; 709/206; 709/217; 709/223; 709/244

(58) Field of Classification Search .................. 709/204, 709/206
See application file for complete search history.

(56) References Cited

U.S. PATENT DOCUMENTS

| | | | |
|---|---|---|---|
| 7,167,910 B2 | 1/2007 | Farnham et al. | |
| 7,177,880 B2 | 2/2007 | Ruvolo et al. | |
| 2002/0106066 A1* | 8/2002 | Swanson et al. | 379/196 |
| 2005/0091202 A1* | 4/2005 | Thomas | 707/3 |
| 2005/0197846 A1 | 9/2005 | Pezaris et al. | |
| 2005/0203929 A1 | 9/2005 | Hazarika et al. | |
| 2006/0048059 A1 | 3/2006 | Etkin | |
| 2006/0248573 A1* | 11/2006 | Pannu et al. | 726/1 |
| 2007/0180078 A1 | 8/2007 | Murphy et al. | |
| 2007/0266097 A1 | 11/2007 | Harik et al. | |
| 2008/0034061 A1 | 2/2008 | Beares | |
| 2008/0052371 A1* | 2/2008 | Partovi et al. | 709/217 |

OTHER PUBLICATIONS

Email Connections, Google Operating Systems, Nov. 5, 2007, 3 pages, http://googlesystem.blogspot.com/2007/11/email-connections.html.
Aron Culotta, Extracting Social Networks and Contact Information from Email and the Web, 8 pages, Amherst, MA, USA, http:www.ceas.cc/papters-20041176.pdf.
Network Weaving, Nov. 25, 2007, 2 pages, http://www.networkweaving.com/blog/2007/11/email-social-graph.html.
Yahoo! to Reinvent Mobile Communications with Yahoo! oneConnect(TM), Feb. 12, 2008, Comtex, http://files.shareholder.com/downloads/YHOO/237942776x0x169085/50f7ee62-2aa1-4ca5-bb88-308829e68323/YHOO_News_2008_2_12_General.pdf.

* cited by examiner

*Primary Examiner* — Jude J Jean Gilles
(74) *Attorney, Agent, or Firm* — Vierra Magen Marcus & DeNiro LLP

(57) ABSTRACT

A method for determining whether to recommend a social relationship between a social network member and another party is disclosed. Electronic communication activity of the social network member and the other party is monitored. Based on a number of characteristics of the communication, a determination is made as to whether to recommend the party to the member as a social network friend. The characteristics can include how the parties communicate—whether through email, instant messaging and/or voice communication, whether the parties send direct email messages to each other, whether they communicate as part of a group email message, the location of each parties address in the email message and whether communication includes sharing activity.

20 Claims, 7 Drawing Sheets

LEVERAGING COMMUNICATIONS TO IDENTIFY SOCIAL NETWORK FRIENDS

BACKGROUND

Electronic social networking communication is a popular way for individuals to communicate with one another. Social networking web sites allow users to connect for various personal, professional and common interests. Electronic social networking systems are dependent upon users connecting to and identifying other individuals within the social network as "friends," those individual with whom they are willing to share greater access to personal information than non-friends.

Most social networking systems include some mechanism for allowing users to find "friends" within the social network. One example of such a friend finding mechanism is an e-mail search query, inviting users to upload addresses, search for names, or access address books run by popular e-mail services, after which the system attempts to match the user addresses with other network members. If addressees in the users contact list are not members of the network, an opportunity to invite the addressee is provided. Other algorithms identify "friends of friends," or network members which are connected one's own friends within the social network. The more friends one has within the social network, the more powerful the social network becomes.

SUMMARY

Communication usage within a service provider's online service environment is leveraged to identify a social network member's potential friends within the social network. Communication activity between a member and other parties is used to determine whether the parties should be recommended to the member for inclusion in a social networking friendship. Members and parties may both be participants of a social network run by the service provider, or the second party may not be a participant of the social network. In the case where the second party is not a participant of the social networking service, the second party may be invited to join the social networking service based on the communications between the individuals.

A method for determining whether to recommend a social relationship between an electronic social network member and at least one second party is disclosed. Electronic communication activity of the social network member and a second party is monitored. Based on a number of characteristics of the communication, a determination is made as to whether to recommend the party to the member as a social network friend.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Technology for leveraging communication usage within a service provider's environment to identify potential friends within a social network is disclosed. Communication activity, and in one implementation email communications, are used to determine whether parties with whom users (or "members") of the service provider's network communicate should be recommended to them for inclusion in a social networking friendship. Members and parties may both be participants of a social network run by the service provider, or the second party may not be a participant of the social network. In the case where the second party is not a participant of the social networking service, the second party may be invited to join the social networking service based on the communications between the individuals.

In one example, two users who are both members of the social network will communicate via various mechanisms, such as e-mail, instant messaging, or Voice Over IP (VOIP). Based on a number of communication based characteristics between a member and an addressee, a determination can be made whether to recommend elevation of the addressee to "friend" status. It should be understood that the terms "member" and "second party" are for identification purposes only. A second party may initiate a communication event with a member or vice versa. In some communication events, there may be a number of parties other than the member.

Figure 1:
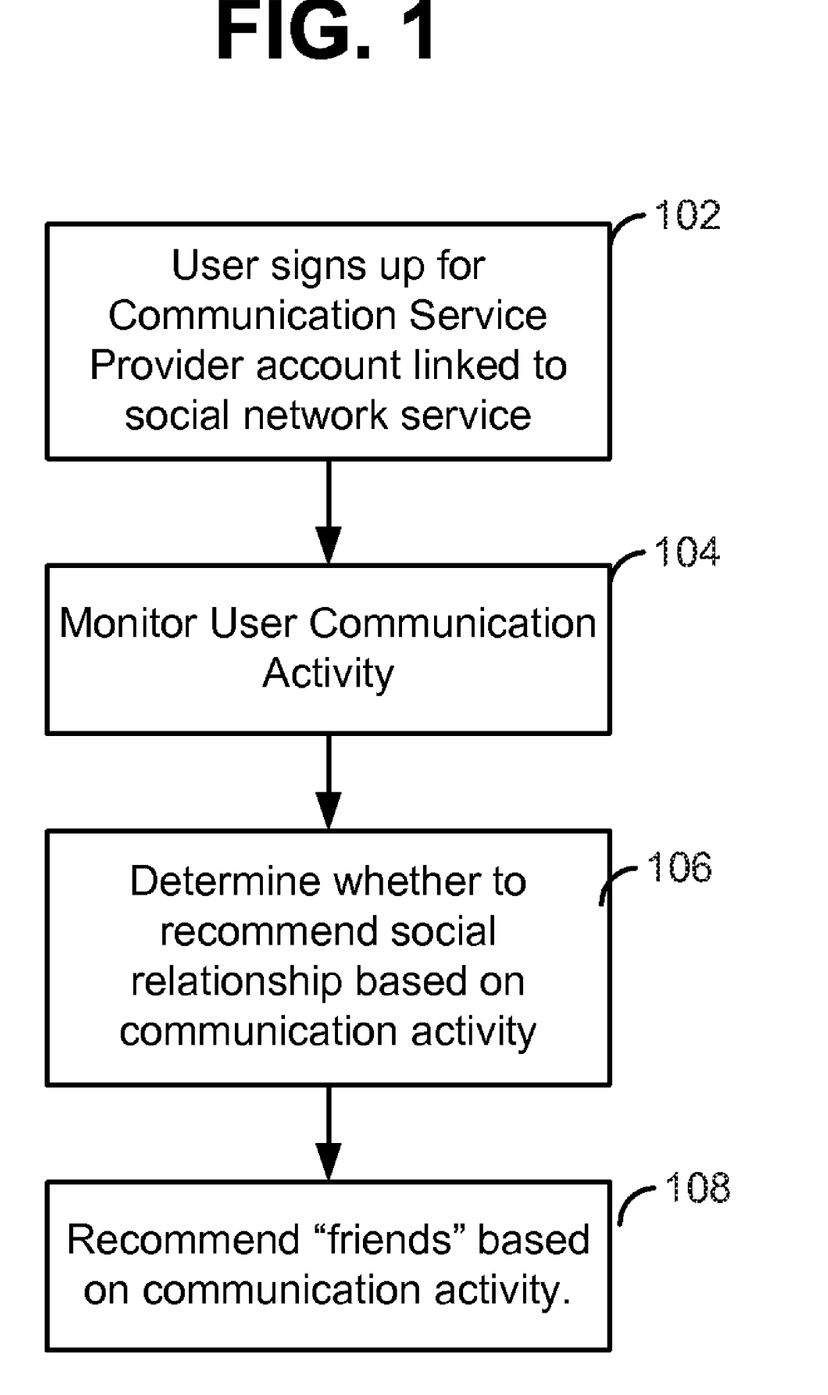
FIG. 1 is a method for identifying additional friends within a social network.

FIG. 1 illustrates an exemplary method in accordance with the present technology. At step 102, an individual signs up with a communication service provider account linked to a social network service. One example of such a service is Windows Live, with a social networking component known as Windows Live Spaces and a web-based email service, known as Windows Live Hotmail. The social networking service allows participants to identify other individuals as friends with whom information can be shared. In a social networking service, the member is generally notified of events which occur based on the activity of "friends" within the service. For example, if a friend posts a blog entry, this posting activity will be noted within the service and an event notification sent to friends. If a friend posts photographs to a sharing web site, this activity can also be shared. Various types of social networking activities include photo sharing, web log authoring, social bookmarking, providing status updates, sending group invitations, participating in group discussions, and other types of activities.

A service provider offering both a social networking service and communication services has the ability to leverage the communication services for the benefit of the social networking service. Because the service provider has access to the communication activity for the member, at step 104, member communication activity with other parties can be monitored. At step 106, using the activity monitoring resulting from step 104, the service provider can determine whether to recommend a social relationship based on communication activities. In one example, email communication by social network participants can be monitored and used to suggest friend relationships based on frequency and type of activity. If the system determines that the activity merits recommendation as a friend, then the system can recommend friends based on communication activity at step 108.

Figure 2:
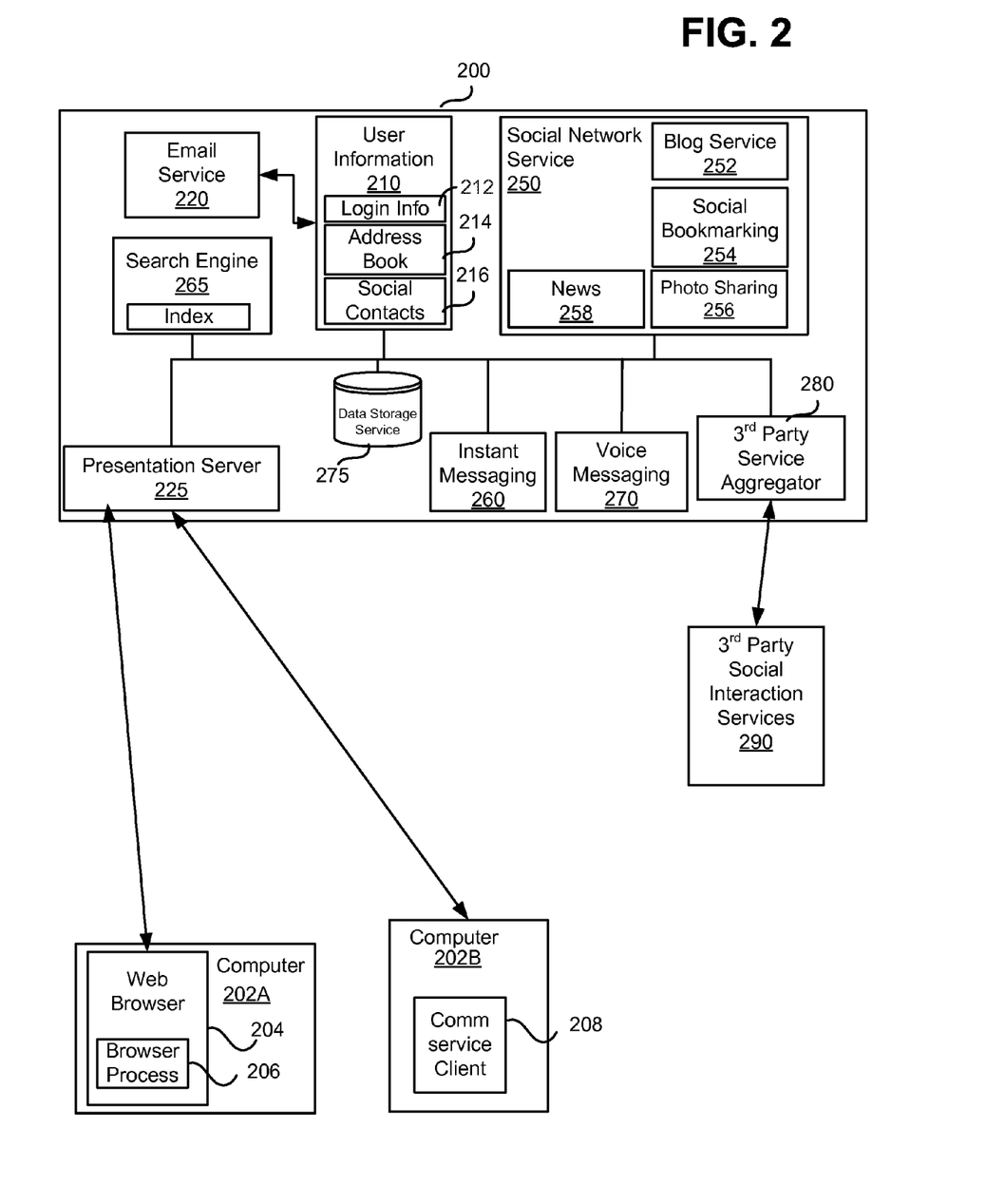
FIG. 2 is a block diagram illustrating a system for providing a social network in accordance with the present technology.

FIG. 2 illustrates an exemplary web service system 200 for implementing the technology presented herein. A web service 200 may include a number of different communication services including, for example, an e-mail service 220, an instant messaging service 260, a voice communication service 270, and a social networking service 250. In order to utilize the communication services provided by the web service provider 200, users create user accounts with a user information service 210. The user information service records log-in information 212 for the user, and creates a data store associated with the user in a data storage service 275. The user information service will maintain the log-in information 212, and associate it with the user, address book 214, and a social contact book 216. The address book 214 can maintain contact information for individuals with whom the user wishes to communicate with, but for whom the user does not generally identify as a "friend". The social contact service 216 maintains a list of the user's "friends" with whom the user communicates using other services provided by the social networking service 250. A separate "buddy list" (not shown) is maintained for services with whom the user interacts via the instant messaging service 260. The voice messaging service 270 can use contact information from the buddy list, the address list, or the social contacts to provide voice communications between members and others. A search engine service which indexes some or all of the user content within the service 200 may also be provided.

The social networking service 250 provided by the web service 200 may include a web blogging service 252, a social bookmarking service 254, a photo sharing service 256, and a news service 258. The blog service 252 allows users to write personal and social commentary which may be presented to both friends, and the public at large. A social bookmarking service 254 allows users to share an interesting web link that the user thinks friends might find interesting. A photo sharing service 256 allows users to share both public and private photos which have been uploaded to the data store 275 with friends and with public. A news service 258 allows users to post status messages which inform their friends of their current activities and planned activities. Users interact with the web service 200 via computers 202A or 202B. Computers 202A and 202B communicate with, for example, a presentation server 225. The presentation server 225 may, in one embodiment, comprise a web server which provides one or more pages and/or web-based applications to a web browser 204 executing a browser process on computer 202A. Alternatively, a dedicated communication service client 208 (such as in instant messaging or VOIP client) may operate on a computer (202B) and communicate with the presentation server, or with one of the services provided by the web service 200 directly. Communication with the presentation server 225 may occur via one or more public and private networks, such as the Internet.

Also shown as a component of web service 200 is a third-party social network service aggregator 280. A third-party service social network service aggregator 280 incorporates information provided by third party social network services 290. Many social networking services provide application programming interfaces (APIs) which allow data to be extracted from the social networking service, or themselves provide information streams, such as, for example, RSS feeds, which allow information to be published from the service and incorporated into other presentation or social networking services. The third-party service aggregator 280 can extract information from third-party networking services or receive the information feed which may then be presented to the user via the presentation service through the social networking service 250. This information can also be used by the service provider 200 to in conjunction with friend recommendations as discussed herein.

Figure 3:
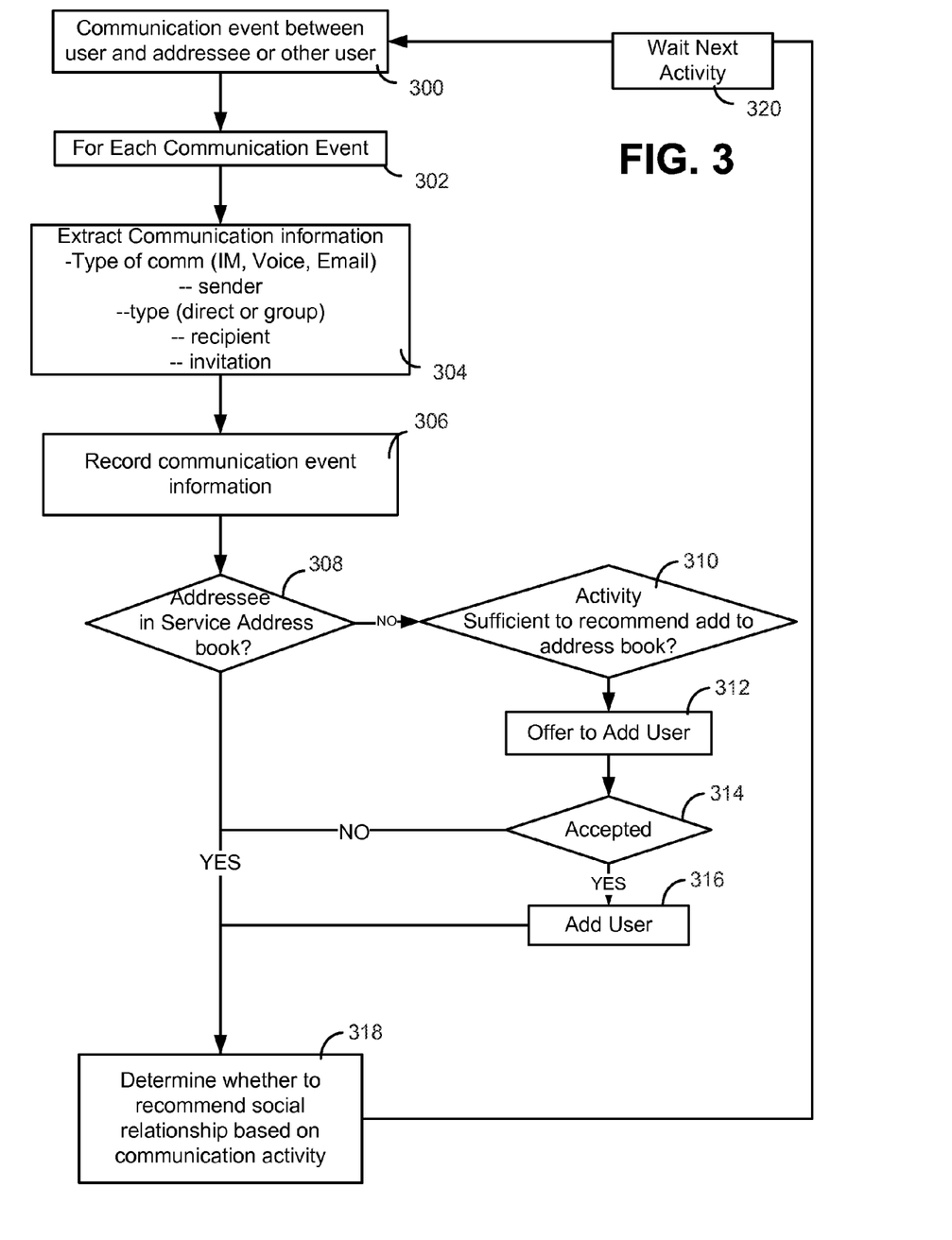
FIG. 3 is a method illustrating monitoring communication events to identify potential friends within a social networking service.

FIG. 3 illustrates a method in accordance with the present technology for monitoring communication activity as discussed above at step 104. At step 300, a communication event occurs between a member and another party. The communication event may comprise one or more of a phone call, an e-mail, an instant message, or any other electronic communication which can be monitored and parsed in accordance with the discussion herein. The communication event may be direct or indirect. A direct communication occurs between two different users each having an endpoint address, such as an instant message or e-mail address, or a phone number. An indirect communication occurs where a user is part of a larger group communication, such as a group email or group chat. Indirect communications can include group chat sessions, group instant messaging sessions, and e-mails to users which are sent directly to the user (the user's address is in the "To:" line along with other users, or in which users are copied either with an address in the carbon copy ("cc:") field, or in the blind carbon copy ("bcc:") field). In accordance with the technology discussed herein, each of these types of communications events can be weighted differently in determining whether or not to recommend a user associated with a particular address as a friend within the context of a social network.

At step 302, for each communication event, at step 304 communication information about the event is extracted. This communication information can include, for example, the type of communication (whether or not it is an instant message, voicemail, voice communication, or e-mail,) the sender of the communication, the addressees of the communication, whether the communication is direct or indirect (including whether members or other parties are in the "to:" field, the carbon copy ("cc:") field, or in the blind carbon copy ("bcc:") field), the type of communication (whether it is a direct communication between individuals or between multiple individuals), and the nature of the communication (whether the communication is, for example, an invitation to an event, generated by the user directly, or generated by an automated event invitation service). This information is recorded at step 306. At step 308, an initial determination may be made as to whether any addressees of a communication are in the address book of a member. For example, if the message is an e-mail, a determination is made as to whether or not the addressee is present in the user's contact data. If the addressee is not present in the user's contact data at step 308, then a determination is made at step 310 as to whether the communication activity is sufficient to recommend the address for addition into the user's address book. Step 310 may, in one embodiment, simply be the act of sending a single e-mail to a user. Alternatively, additional criteria may be implemented to raise the threshold of activity necessary before a recommendation is submitted at step 310. If the activity is insufficient to recommend addition to the user's address book, then the method proceeds to step 318. If the activity is sufficient, then an offer is made to add the addressee at step 312. If the addressee is accepted at step 314, then the user is added at step 316. If not, again the method proceeds to step 318.

At step 318, a determination is made as to whether or not one or more second parties associated from the communication event should be recommended for friendship status within the social network based on the communication activity. Step 318 may occur for each communication event, or may be run periodically after collection of communication information over a series of communication events. Following the collection of event activity, or following step 318, the method awaits further communication activity at step 320.

Figure 4:
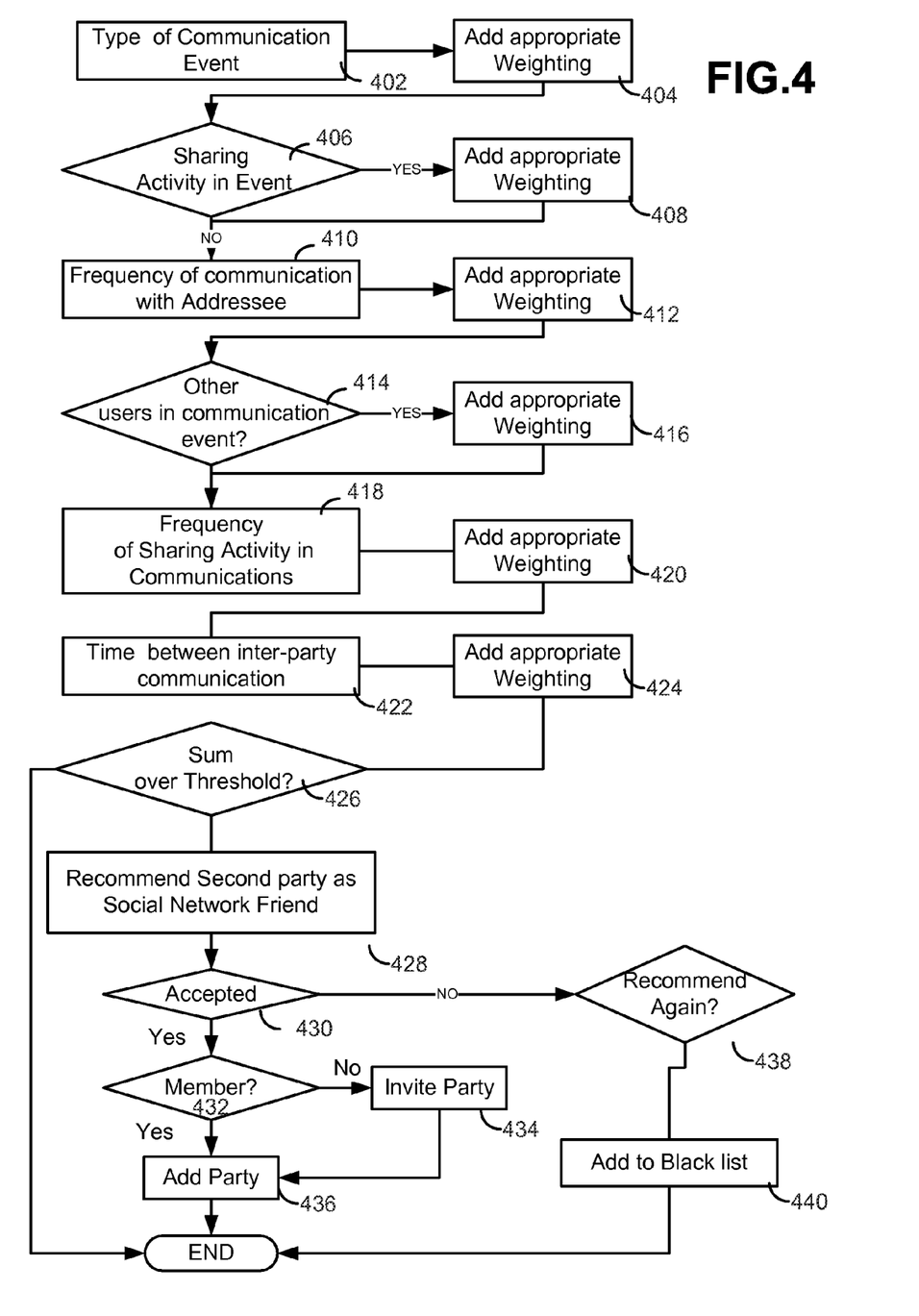
FIG. 4 illustrates a method for determining whether to recommend an individual for friend status based on communications with the individual.

FIG. 4 is a method illustrating how a determination to recommend second party as a friend based on communication information is made. In general, for each party with whom a member communicated, for each party as party of an indirect communication or for parties whose information is parsed from a communication, a weight is assigned to one or more factors associated with the communication activity. If the total of weight of all factors exceeds a threshold, a recommendation to add the addressee is made. Each of the factors identified at steps 402, 406, 410, 414, 418, and 422 may be included or deleted within the context of the present technology.

One factor which is evaluated is the type of communication event at step 402. Instant messages may have a greater weighting than, for example, an e-mail. A direct e-mail between two individuals may have a greater weighting than an e-mail sent out to a group. Appropriate weighting, based on the type of communication event, is added at step 404. At step 406, a determination may be made as to whether sharing activity exists within the event. If a user shares photographs with another user within the communication event, this may be indicative that the user considers the shared information appropriate for a friend, and appropriate weighting based on this factor is added at step 408. At step 410, the frequency of the communication between the parties is reviewed. If a user communicates frequently with another user even though the users are not linked within the social network, this may indicative that the users are friends. Appropriate weighting is added where there is greater frequency of direct communication between the user and an addressee. Conversely, if a user only communicates with an addressee in the context of a group event, as evaluated at step 414, this may be indicative that the user is not friends with the addressee. Likewise, if a user only receives emails from another party, but never sends emails to the party, the likelihood that the other party should be a social network friend is reduced. If other users are in the communication event, appropriate weighting at step 416 may actually reduce the factor of whether or not to add the addressee as a friend. The frequency of sharing activity is evaluated at step 418 and appropriate weighting added at step 420. Likewise, the time between inter-party communications may be examined at step 422 and appropriate weighting added at step 424. The characteristics of communication outlined in FIG. 4 are not exhaustive, and may be include any number of characteristics evaluated and weighted in myriad ways.

Certain factors present in FIG. 4 may be interpreted based on activity in a third party social network service based on information obtained from the third party aggregator. For example, sharing activity or news events may be noted from other social networks, and may contribute to suggesting another party as a friend.

At step 426, the sum of the weights added or subtracted at steps 404, 408, 412, 416, 420 and 424 is determined, and a recommendation made at step 428 if the sum exceeds a threshold. In an alternative method, one or more of the weights may be suitable to allow recommendation of an addressee as a friend. For example, a direct communication—such as an instant message or email—may be sufficient by itself to allow suggestion of another party as a friend.

If the sum of all weights added (or subtracted) is over the threshold at step 426, a notification is sent to the member recommending the second party to the member as a social network friend at 428. The member is provided with the opportunity to accept the recommendation and step 430. If the member accepts the recommendation in step 430, then a determination is made at step 432 as to whether or not the second party is in fact a member of the social network. If the second party is not a member of the social network, then at step 434, an invitation may be sent to the addressee to join the social network. Once the second party accepts the invitation, the party will be added at step 436. If the second party is already a member of the social network, then the addressee will be added to the user's friend's list at step 436. If the second party is not a member of the social network, an invitation may be send to the second party for the party to join the network. If the member does not accept the recommendation at step 430, then at step 438, the member may be prompted to indicate whether the system should never recommend this party again. If the member never wants to see a recommendation concerning this party, the party's name could be added to a blacklist at step 440.

Typically, the communication activity identified in FIG. 3 will occur in an e-mail message. A member, for example, e-mails people from the account which is associated with the web service 200. For each message, information in the e-mail is extracted. This information may include the sender, the recipient address or addressees, other email addresses within the message, the type of e-mail message (whether it's a direct message or to a group), whether there is code within the message indicating a link to a sharing or whether the e-mail is in fact an invitation. In an instant messaging environment, information within the message stream may be used to determine whether or not the individuals communicating should be recommended as social network friends. Generally, instant messaging is a more intimate form of communication than e-mail. In general, people e-mail a large number of people more than they instant message with. As such, the nature of an instant message communication may, in and of itself, constitute a higher waiting than other forms of communication. Factors which may be included when determining whether or not to recommend addressees or addressees parsed from e-mail communications may include whether individuals e-mail each other frequently over a certain period, whether an invitation is contained within the e-mail, whether the e-mail addressee is on a group list with the sender of the e-mail, whether the user and the addressee e-mail each other frequently, and the time between the inter-party communications.

Figure 5:
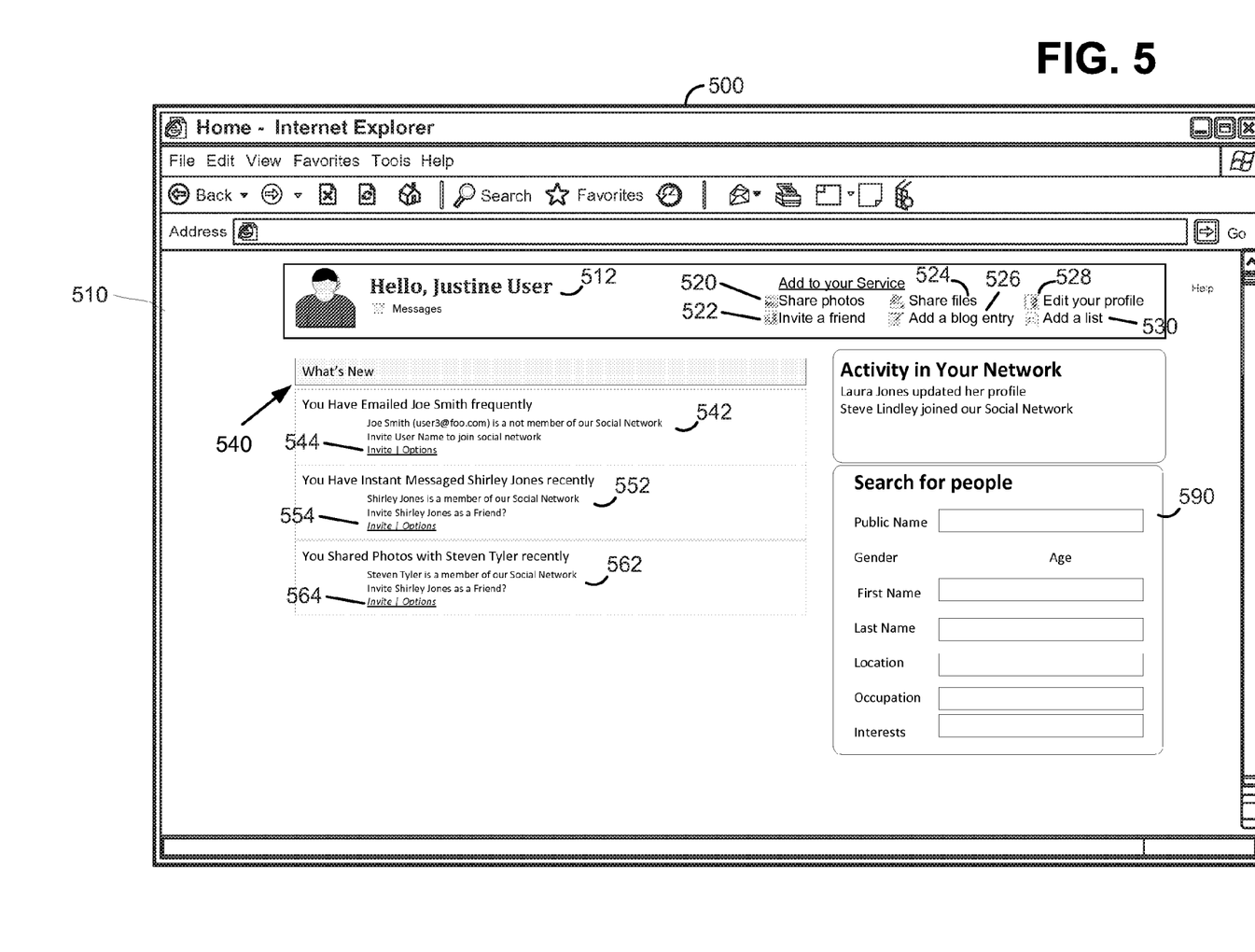
FIG. 5 is an exemplary user interface for presenting a recommendation to a user.

FIG. 5 illustrates a first user interface for presenting the recommendations determined in accordance with the present technology to a user. FIG. 5 illustrates a browser window 500 which may be presented by the presentation server 225. The browser window displays a home page 510 for the social networking service. The social networking service home page identifies the user at 512, and allows the user to select amongst various service activities including sharing photos 520, inviting a friend 522, sharing files 524, adding a blog entry 526, editing the user's profile 528, and adding a list of 530. An information stream 540 provides the user with notifications of activity which have occurred in the network. The activity stream 540 may also provide recommendations to the user. For example, at 542, the system is determined that the user (Justine User) has e-mailed Joe Smith (user3@foo.com), with sufficient activity to justify recommending Joe Smith as a friend to Justine User, or may be generic for any recommendation provided by the system. Alternatively, it may be based on the one or more weightings that the system has used to determine to make the recommendation. For example, the notification might be changed to "you have shared photos with Joe Smith frequently," or "you have invited Joe Smith to several parties". The message 542 also indicates that Joe Smith is not a member of the social networking service. An action link 544 implements the action identified in the message "invite Joe Smith to join the social network."

Upon selection of the action link 544, an invitation will be sent to Joe Smith by them to join the social network service and adding Joe Smith as a friend to the user. A second message 552 indicates that the user has instant messaged Shirley Jones and that Shirley Jones is a member of the social network. Because the system has determined that a recommendation should be made to add Shirley Jones as a friend, the action link 554 will invite Shirley Jones to become friends with the user. Upon acceptance of the friendship relationship by Shirley Jones, the two will be linked within the social networking service. Alternatively, at 562, a message may be presented indicating that type of activity which has occurred between the user and the addressee. At 562, the message indicates that the user has shared photos with "Steven Tyler" recently and that Steven is a member of the social network. Again, the action link 564 will send an invite to Steven Tyler to become friends with the user. Generally, an activity stream is emanating and a user search within the social network 590 is also provided.

Figure 6:
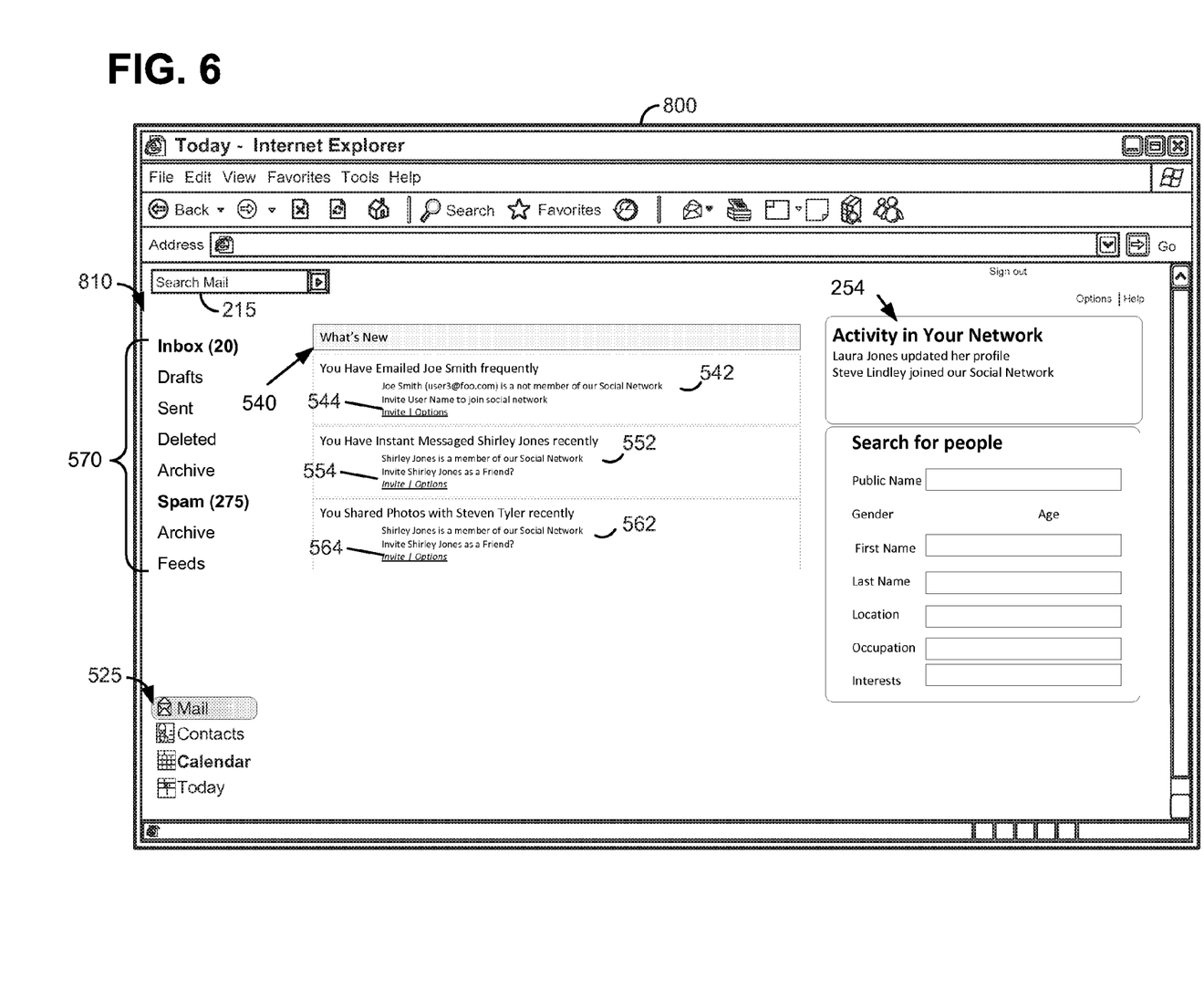
FIG. 6 is a second exemplary interface for presenting a recommendation for a user.

FIG. 6 illustrates an alternative user interface representing recommendations to the user. In this case a browser window 800 shows an e-mail home page view 810. A left hand menu 570 allows a user to accept one or more folders within the e-mail inbox and a menu 525 allows a user to navigate within various services associated with the e-mail service. These include the mail service directly, a today page, a contacts page, and a calendar element. Messages 542, 552 and 562 as well as their associated action links, can be presented on this page or any other suitable interface within the social networking service or the e-mail service. Alternatively, these links may be presented by system-generated messages in an instant message stream, or by system-generated voice messages within a voice communication scheme.

Figure 7:
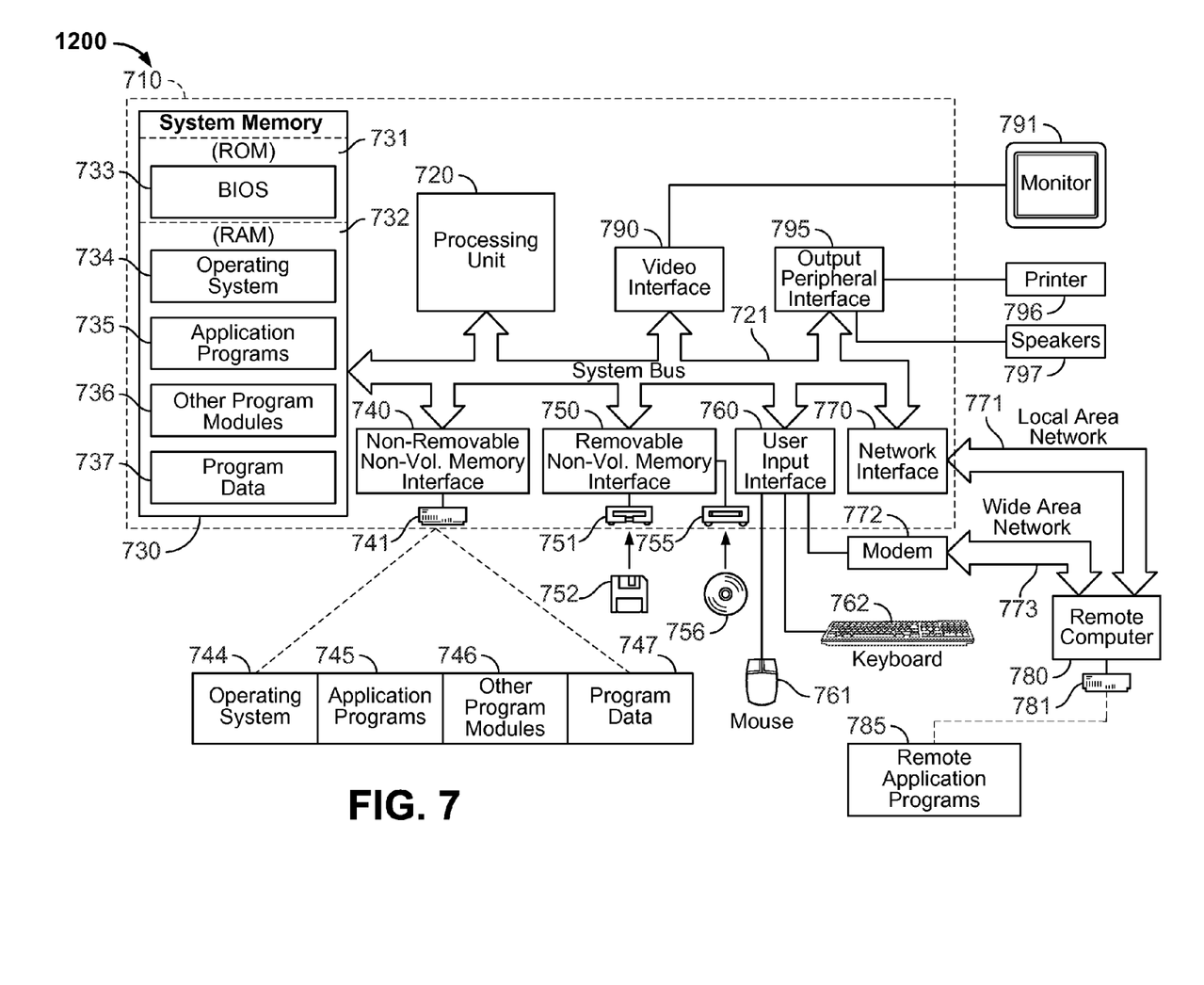
FIG. 7 is a processing system suitable for implementing any of the processing systems identified above with respect to FIG. 2.

FIG. 7 illustrates an example of a suitable computing system environment 1200 such as personal computer.

With reference to FIG. 7, an exemplary system for implementing the technology includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 740 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 20 through input devices such as a keyboard 762 and pointing device 761, commonly referred to as a mouse, trackball or touch pad.

Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 790.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description of the system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method for enabling an electronic social relationship between a social network member and a second party who is not a social network friend of the social network member, comprising:
   monitoring a plurality of types of electronic communications of the social network member and detecting communication traffic using one of the types of electronic communication between the social network member and the second party;
   automatically determining whether the communication traffic merits recommendation of the second party to the member as a social network friend, the recommendation based on one or more characteristics of the communication traffic between the parties; and
   if the communication traffic merits recommending the second party to the social network member, then providing a message to the social network member recommending the second party as social network friend.

2. The method of claim 1 wherein the message includes an action link enabling an action on the recommendation.

3. The method of claim 2 wherein the action includes joining the second party as friend if the second party is a member of the social network.

4. The method of claim 2 wherein the action includes inviting the second party to the social network if the second party is not a member of the social network.

5. The method of claim 1 wherein the step of determining comprises:
   determining, for each type of communication, a plurality of characteristics of each communication between the social network member and the at least one second party;
   assigning a weight to each of the plurality of characteristics; and
   summing the weight assigned to each characteristic and if said sum exceeds a threshold, recommending establishment of a social relationship between the member at said at least one second party.

6. A method for determining whether to recommend a social relationship between an electronic social network member and at least one second party wherein a social network administrator provides communication services to the member, comprising:
   monitoring a plurality of types of electronic communication exchanges of the social network member and said at least one second party via communication services provided by the administrator of the social network;
   determining a plurality of characteristics of the exchanges of communication activity between the social network member and the at least one second party;

assigning a weight to each of the plurality of characteristics of communication activity;

detecting an exchange using one of the plurality of types of electronic communication activity of one or more the plurality of types and applying an assigned weight to the communication activity; and automatically summing weights of each communication activity detected and applied, and if said sum exceeds a threshold, automatically recommending establishment of a social relationship between the member at said at least one second party.

7. The method of claim 6 wherein said method is performed for each communication event between the social network member and each of a plurality of second parties.

8. The method of claim 6 wherein the step of assigning includes assigning a weight to each of a plurality of characteristics comprised of one or more of:

whether the communication activity comprises a direct email message communicated between the member and a second party;

whether the communication activity is bi-directional;

whether the communication activity comprises a group email message communicated between the member and a group including the second party; and whether the communication activity comprises an email message including sharing activity between the member and said second party.

9. The method of claim 6 wherein the communication activity comprises instant messaging.

10. The method of claim 6 wherein the communication activity comprises a voice communication.

11. The method of claim 6 wherein said plurality of characteristics include one or more of:

whether the activity is a direct or group communication between the member and second parties;

whether the activity is hosted by a third party service;

the frequency of events in the activity of communication with the second party;

whether the activity is bi-directional;

the time between communications by the member and second party; and/or whether the activity includes sharing activity between the member and a second party.

12. A method for determining an online relationship between two users, one user being a member of a social network service provided by a service provider having access to a plurality of types of communication information from said one user, comprising:

monitoring the plurality of types of communication activity between the member and one or more second parties;

for each type of communication, determining one or more factors concerning the communication which make the communication more or less likely to represent activity between individuals who may wish to be social network friends;

detecting a communication exchange between the two users, each exchange using one of the plurality of types of communication activity and comprising one or more messages between the two users;

characterizing each communication exchange between the social network member and the second party by assigning a weight to the factors present in the exchange based on the communication type and the communication factors; and if a sum of all weights of the communication activity between the member and the one or more second parties merits recommending the second party to the social network member, then providing a message to the social network member recommending second party as social network friend, the message including an action link enabling an action on the recommendation.

13. The method of claim 12 wherein the step of providing a message includes displaying one or more suggestions in a user interface comprising a home page for the social network member.

14. The method of claim 12 wherein the step of providing a message includes displaying one or more suggestions in a mail service user interface.

15. The method of claim 12 wherein assigning a weight to each of the plurality of factors of communication activity, and wherein said factors include:

the form of the electronic communication activity;

whether the activity is a direct or group communication between the member and second parties;

whether the activity is hosted by a third party service;

the frequency of communication with the second party;

whether the communication is bi-directional;

the time between communications by the member and second party; and/or whether the activity includes sharing activity between the member and a second party.

16. The method of claim 12 wherein the action link enables joining the second party as friend if the second party is a member of the social network.

17. The method of claim 12 wherein the action link enables inviting the second party to the social network if the second party is not a member of the social network.

18. The method of claim 17 wherein the method further includes automatically joining the second party as a friend if the second party joins the social network.

19. The method of claim 1 wherein the social network member has an address book associated with the social network user, and the method further includes:

determining whether the second user is recorded in the address book; and if the social network user is not recorded in the address book, determining whether the communication traffic merits recommendation of the second party as an addition to the address book.

20. The method of claim 19 wherein the steps of automatically determining and providing a message are performed whether or not the second user is added to the address book.

* * * * *